United States Patent
Kotsuji et al.

(10) Patent No.: US 6,548,604 B1
(45) Date of Patent: Apr. 15, 2003

(54) RUBBER, CROSSLINKABLE RUBBER COMPOSITION, AND CROSSLINKED OBJECT

(75) Inventors: Hiroyuki Kotsuji, Kawasaki (JP); Akira Tsukada, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/089,103

(22) PCT Filed: Oct. 16, 2000

(86) PCT No.: PCT/JP00/07161

§ 371 (c)(1), (2), (4) Date: Apr. 15, 2002

(87) PCT Pub. No.: WO01/27199

PCT Pub. Date: Apr. 19, 2001

(30) Foreign Application Priority Data

Oct. 15, 1999 (JP) ............................................. 11-293268

(51) Int. Cl.$^7$ ................................................. C08F 8/04
(52) U.S. Cl. .............................. 525/328.3; 525/329.3; 525/338; 525/343; 525/387; 526/80; 526/87
(58) Field of Search ............................. 525/329.3, 338, 525/343, 387; 526/80, 87

(56) References Cited

U.S. PATENT DOCUMENTS 5,013,797 A * 5/1991 Hayashi et al. .......... 525/328.3
5,369,166 A    11/1994 Ozawa et al.

FOREIGN PATENT DOCUMENTS

| JP | 63-095242 | 4/1988 |
|----|-----------|--------|
| JP | 03-109449 | 9/1991 |
| JP | 05-009337 | 1/1993 |
| JP | 5-247266  | 9/1993 |
| JP | 06-073220 | 3/1994 |
| JP | 2000-044913 | 2/2000 |

* cited by examiner

Primary Examiner—Fred Teskin
(74) Attorney, Agent, or Firm—Armstrong, Westerman & Hattori, LLP

(57) ABSTRACT

A nitrile group-containing highly saturated copolymer rubber comprising (a) 10–40 wt. % of α,β-ethylenically unsaturated nitrile monomer units, (b) 10–60 wt. % of α,β-ethylenically unsaturated carboxylic acid ester monomer units, (c) 0.01–21 wt. % of conjugated diene monomer units, and (d) 14–69.99 wt. % of saturated conjugated diene monomer units, wherein the sum of monomer units (c) plus (d) is 20–70 wt. %, the ratio of monomer units (d)/[monomer units (c) plus (d)] is at least 70 wt. %, and the difference between the extrapolated glass transition-initiating temperature (Tig) and the extrapolated glass transition-ending temperature (Teg), as measured by DSC is not higher than 10° C. The copolymer rubber gives a crosslinked product having good cold resistance, oil resistance and dynamic properties.

10 Claims, No Drawings

RUBBER, CROSSLINKABLE RUBBER COMPOSITION, AND CROSSLINKED OBJECT

TECHNICAL FIELD

This invention relates to a nitrile group-containing highly saturated copolymer rubber giving a crosslinked rubber product having excellent cold resistance, a crosslinkable rubber composition comprising the highly saturated copolymer rubber, and a crosslinked rubber product made by crosslinking the rubber composition.

BACKGROUND ART

In recent years, a nitrile group-containing highly saturated copolymer rubber represented by a hydrogenated acrylonitrile-butadiene copolymer rubber attracts attention. A nitrile group-containing highly saturated copolymer rubber has a reduced amount of carbon-carbon unsaturated bonds in the backbone chain as compared with an acrylonitrile-butadiene copolymer rubber, and thus, the highly saturated copolymer rubber has good heat resistance, oil resistance and ozone resistance.

However, the cold resistance of a highly saturated nitrile group-containing is occasionally reduced depending upon the content of a nitrite group and the content of carbon-carbon double bonds in the nitrile group-containing highly saturated copolymer rubber.

In general, cold resistance can be enhanced by reducing the content of an acrylonitrile group in an acrylonitrile-butadiene copolymer rubber. But, cold resistance of a nitrile group-containing highly saturated copolymer rubber is occasionally increased and occasionally not increased, when the content of a nitrile group is reduced.

To improve cold resistance of a nitrile group-containing highly saturated copolymer rubber, a nitrile group-containing highly saturated copolymer rubber comprising four kinds of monomer units. i.e. (a) α,β-ethylenically unsaturated nitrile monomer units, (b) α,β-ethylenically unsaturated carboxylic acid ester monomer units, (c) conjugated diene monomer units, and (d) saturated conjugated diene monomer units, was proposed in, for example, Japanese Unexamined Patent Publication No. S63-95242 and ibid. H3-109449. However, the proposed nitrile group-containing highly saturated copolymer rubber gives a crosslinked rubber product which is liable to occasionally exhibits insufficient cold resistance and physical properties varying when it is placed in contact with oil.

DISCLOSURE OF THE INVENTION

A primary object of the present invention is to provide a nitrile group-containing highly saturated copolymer rubber giving a crosslinked rubber product having good cold resistance, oil resistance and dynamic properties; a crosslinkable rubber composition comprising the highly saturated copolymer rubber; and a crosslinked rubber product made by crosslinking the rubber composition.

To achieve the above-mentioned object, the present inventors made extensive research and found that a nitrile group-containing highly saturated copolymer rubber having a specific monomer unit composition, and exhibiting a reduced temperature difference between the extrapolated glass transition-initiating temperature (Tig) and the extrapolated glass transition-ending temperature (Teg), as measured by the differential scanning calorimetry, which copolymer rubber is prepared by carrying out polymerization while the monomer concentration In a polymerization reaction mixture is controlled depending upon the reactivity of monomers, gives a crosslinked rubber product having good cold resistance, oil resistance and dynamic properties. Based on this finding, the present invention has been completed.

Thus, in one aspect of the present Invention, there is provided a nitrile group-containing highly saturated copolymer rubber comprising (a) 10 to 40% by weight of α,β-ethylenically unsaturated nitrile monomer units, (b) 10 to 60% by weight of α,β-ethylenically unsaturated carboxylic acid ester monomer units, (c) 0.01 to 21% by weight of conjugated diene monomer units, and (d) 14 to 69. 99 by weight of saturated conjugated diene monomer units, wherein the sum of monomer units (c) and monomer units (d) is in the range of 20 to 70% by weight, the ratio of monomer units (d) to the sum of monomer units (c) and monomer units (d) is at least 70% by weight, and the difference between the extrapolated glass transition-initiating temperature (Tig) and the extrapolated glass transition-ending temperature (Teg), as measured by the differential scanning calorimetry, is not higher than 10° C.

In another aspect of the present invention, there is provided a crosslinkable rubber composition comprising 100 parts by weight of the above-mentioned nitrile group-containing highly saturated copolymer rubber, and 0.1 to 5 parts by weight of a sulfur-containing vulcanizing agent or 1 to 16 parts by weight of an organic peroxide crosslinking agent.

In still another aspect of the present invention, there is provided a crosslinked rubber product made by crosslinking the above-mentioned crosslinkable rubber composition.

BEST MODE FOR CARRYING OUT THE INVENTION (Nitrile Group-Containing Highly Saturated Copolymer Rubber)

The nitrile group-containing highly saturated copolymer rubber of the present invention rubber comprises (a) 10 to 40% by weight of α,β-ethylenically unsaturated nitrile monomer units, (b) 10 to 60% by weight of α,β-ethylenically unsaturated carboxylic acid ester monomer units, (c) 0.01 to 21% by weight of conjugated diene monomer units, and (d) 14 to 69.99% by weight of saturated conjugated diene monomer units, wherein the sum of monomer units (a) and monomer units (d) is in the range of 20 to 70% by weight, the ratio of monomer units (e) to the sum of monomer units (c) and monomer units (d) is at least 70% by weight, and the difference between the extrapolated glass transition-initiating temperature (Tig) and the extrapolated glass transition-ending temperature (Teg), as measured by the differential scanning calorimetry, is not higher than 10° C.

As specific examples of an α,β-ethylenically unsaturated nitrile monomer forming the α,β-ethylenically unsaturated nitrile monomer units (a), there can be mentioned acrylonitrile; α-halogenoacrylonitrile such as α-chloroacrylonitrile and α-bromoacrylonitrile; and α-alkylacrylonitrile such as mehacrylonitrile and ethacrylonitrile. Of these, acrylonitrile is preferable. The α,β-ethylenically unsaturated nitrile monomers may be used either alone or as a combination of at least two thereof.

The content of α,β-ethylenically unsaturated nitrile monomer units (a) in the nitrile group-containing highly saturated copolymer rubber is in the range of 10 to 40% by weight, preferably 12 to 35% by weight and more preferably 15 to 30% by weight. When the content of α,β-ethylenically unsaturated nitrile monomer units (a) is too small, the resulting crosslinked rubber product has reduced oil resistance. In contrast, when the content of α,β-ethylenioally unsaturated nitrile monomer units (a) is too large, the resulting crosslinked rubber product has poor rubber cold resistance.

As specific examples of an α,β-ethylenically unsaturated carboxylic acid eater monomer forming the α,β-ethylenically unsaturated carboxylic acid ester monomer units (b), there can be mentioned acrylates and methacrylates, which have an alkyl group having 1 to 18 carbon atoms, such as methyl acrylate, ethyl acrylate, butyl acrylate, n-dodecyl acrylate, methyl methacrylate and ethyl methacrylate; acrylates and methacrylates, which have an alkoxyalkyl group having 2 to 18 carbon atoms, such as methoxymethyl acrylate and methoxyethyl methacrylate; acrylates and methacrylates, which have a cyanoalkyl group having 2 to 18 carbon atoms, such as α-cyanoethyl acrylate, β-cyanoethyl acrylate and cyanobutyl acrylate, acrylates and methacrylates, which have a hydroxyalkyl group having 1 to 18 carbon atoms, such as 2-hydroxyethyl acryalte, hydroxypropyl acrylate and 2-hydroxyethyl methacrylate; acrylates and methacrylates, which have an aminoalkyl group with alkyl groups each having 1 to 18 carbon atoms, such as dimethylaminomethyl acrylate, diethylaminoethyl acrylate and dimethylaminoethyl methacrylate; acrylates and methacrylates, which have a trifluoroalkyl group having 1 to 18 carbon atoms, such as trifluoroethyl acrylate and tetrafluoropropyl methacrylate; benzyl acrylates having a fluoro-substituent and benzyl methacrylates having a fluoro-substituent, such as fluorobenzyl acrylate and fluorobenzyl methacrylate; and unsaturated dicarboxylic acid monoalkyl esters and unsaturated dicarboxylic acid dialkyl esters, which have an alkyl group or alkyl groups having 1 to 18 carbon atoms, such as monoethyl maleate, dimethyl maleate, dimethyl fumarate, dimethyl itaconate, n-butyl itaconate and diethyl itaconate. Of these, acrylates and methacrylates, which have an alkyl group, are preferable. Butyl acrylate is especially preferable. The α,β-ethylenioally unsaturated carboxylic acid ester monomers may be used either alone or as a combination of at least two thereof.

The content of α,β-ethylenically unsaturated carboxylic acid ester monomer units (b) in the nitrile group-containing highly saturated copolymer rubber is In the range of lo to 60% by weight, preferably 15 to 55% by weight and more preferably 20 to 50% by weight. When the content of α,β-ethylenically unsaturated carboxylic acid ester monomer units (b) is too small, the resulting crosslinked rubber product has poor cold resistance. In contrast, when the content of α,β-ethylenically unsaturated carboxylic acid monomer units (b) is too large, the resulting crosslinked rubber product has poor oil resistance and dynamic properties.

As specific examples of conjugated diene monomer forming conjugated diene monomer units (c) in the nitrile group-containing highly saturated copolymer rubber, there can be mentioned 1,3-butadiene, isoprene, 2,3-dimethyl-1,3-butadiene and 1,3-pentadiene, Of these, 1,3-butadiene is preferable. The conjugated diene monomers may be used either alone or as a combination of at least two thereof.

The content of conjugated diene units (c) in the nitrile group-containing highly saturated copolymer rubber is in the range of 0.01 to 21% by weight, preferably 0.05 to 16.25% by weight and more preferably 0.01 to 21% by weight. When the content of conjugated diene units (c) is too large, the resulting crosslinked rubber product has poor heat resistance. In contrast, when the content of conjugated diene units (c) is too small, the rubber product has reduced crosslinkability, and a crosslinked rubber product has poor mechanical strength, even if the crosslinked rubber product can be produced.

The saturated conjugated diene units (d) in the nitrile group-containing highly saturated copolymer rubber have a structure such that the carbon-carbon double bonds of conjugated dione monomer units have been at least partly saturated by hydrogenation.

The content of saturated conjugated diene monomer units (d) in the nitrite group-containing highly saturated copolymer rubber is in the range of 14 to 69.99% by weight, preferably 18.75 to 64.95% by weight and more preferably 28 to 59.9% by weight. When the content of saturated conjugated diene monomer units (d) is too small, the crosslinked rubber product has poor heat resistance. In contrast, when the content of saturated conjugated diene monomer units (d) is too large, the crosslinked rubber product exhibits poor dynamic properties and undesirably large compression set.

The sum of conjugated diene monomer units (c) and saturated conjugated diene monomer units (d) in the nitrile group-containing highly saturated copolymer rubber of the present invention is in the range of 20 to 70% by weight, preferably 25 to 65% by weight and more preferably 35 to 60% by weight. When the sum of conjugated diene monomer units (c) and saturated conjugated diene monomer units (d) is too small, the resulting crosslinked rubber product has poor dynamic properties. In contrast, when the sum of conjugated diene monomer units (c) and saturated conjugated diene monomer units (d) is too large, the resulting crosslinked rubber product has poor cold resistance and oil resistance.

The ratio of monomer units (d) to the sum of monomer units (c) and monomer units (d) is at least 70% by weight, preferably at least 75% by weight and more preferably at least 80% by weight. If this ratio is too small, the resulting crosslinked rubber product has poor heat resistance, oil resistance and ozone resistance, preferable.

The nitrile group-containing highly saturated copolymer rubber of the present invention preferably has a number average a molecular weight in the range of 10,000 to 2,000,000, more preferably 30,000 to 1,500,000 and especially preferably 50,000 to 1,000,000, When the number average molecular weight is too small, the rubber tends to have too low viscosity and have poor mechanical strength such as tensile strength. In contrast, when the number average molecular weight Is too large, the rubber tends to have too high viscosity and have poor processability.

In the nitrile group-containing highly saturated copolymer rubber of the present invention, the temperature difference (ΔT) between the extrapolated glass transition-initiating temperature (Tig) and the extrapolated glass transition-ending temperature (Teg), as measured by the differential scanning calorimetry according to JIS K7121 "method of measuring transition temperature of plastics", is not higher than 10° C., preferably not higher than 9° C., and more preferably not higher than 8.5° C.

In the nitrile group-containing highly saturated copolymer rubber of the present invention, the monomer units (a), monomer units (b), and the sum of monomer units (c) plus monomer units (d) preferably have a composition distribution breadth of not larger than 20%, more preferably not larger than 15% by weight and especially preferably not larger then 10% by weight, When the composition distribution breadth is too large, the temperature difference ($\Delta T$) between the extrapolated glass transition-initiating temperature (Tig) and the extrapolated glass transition-ending temperature (Teg) is liable to become undesirably large.

By the term "composition distribution breadth" as herein used, we mean the value in % as defined by the equation:

[(Mmax−Mmin)/Mt]×100 wherein M is content (%) of units of a certain monomer in the total polymer, Mmax is the maximum content (%) of units of the monomer as measured on minute sections of the polymer, and Mmin is the minimum content (%) of units of the monomer as measured on the minute sections of the polymer. More specifically content Ms (%) of units of a monomer is measured on minute sections each having a length corresponding to 1 to 5% by weight, preferably 2 to 4% by weight, of a polymer molecule as calculated on the basis of number average molecular weight. The maximum value of content Ms and the minimum value of content Ms are Mmax and Mmin, respectively, as measured on the respective minute sections of polymer. The content Ms of units of a monomer in each minute section of polymer can be determined by measuring the amount of monomer consumed per each stage during which the polymerization conversion is increased by a predetermined value.

The content of each of monomer units (a), monomer units (b), monomer units (c) and monomer units (d) in the nitrile group-containing copolymer rubber can be determined advantageously by employing a combination of plural methods selected from nitrogen content-determination by semi-micro Kjeldahl method, unsaturation content-determination by infrared absorption spectroscopy or iodine value determination, and identification of partial structures or content ratio determination by infrared absorption spectroscopy, $^1$H-NMR, $^{13}$C-NMR and pyrolysis gas chromatography. Of these, identification of partial structures or content ratio determination by $^1$H-NMR is generally most reliable, but, a plurality of peaks in a $^1$H-NMR chart occasionally coincide with each other which render the determination difficult. Therefore, a combination of $^1$H-NMR with other methods is especially preferable.

The nitrile group-containing highly saturated copolymer rubber of the present invention is preferably made by a process wherein $\alpha,\beta$-ethylenically unsaturated nitrile monomer, $\alpha,\beta$-ethylenically unsaturated carboxylic acid ester monomer and conjugated dione monomer are copolymerized, and then the conjugated diene monomer units in the copolymer are selectively hydrogenated. Monomer concentrations in a polymerization reaction mixture are controlled by adding monomers depending upon the reactivity of monomers in the course of copolymerization so that each monomer composition breadth of monomer units (a), monomer units (b) and monomer units (c) becomes small. For example, a target molecular weight of a polymer is predetermined, and the concentrations of monomers in each section corresponding to 1 to 5% by weight, preferably 2 to 4% by weight, of the total polymerization conversion were controlled. The control can be effected by adding monomers in the course of copolymerization, The amounts of monomers added are varied depending upon the reactivity of monomers. It is not necessary to measure the monomer concentrations in each section. Namely, a manner in which the concentration of each monomer should be controlled in the course of polymerization is determined by a preliminary experiment, and the polymerization can be carried out according to the previously determined manner. A predominant part of the preliminary experiment can be achieved by simulation by a computer and the results obtained by simulation can be confirmed by experiment.

Hydrogenation of the copolymer rubber comprising monomer units (a), monomer units (b) and monomer units (c) is carried out to an extent such that the ratio of monomer units (d) to the sum of monomer units (c) plus monomer units (d) reaches at least 70% by weight, preferably at least 75% by weight and more preferably at least 80% by weight. The copolymer rubber before the hydrogenation does not comprise monomer units (d), but comprises monomer units (c). The composition distribution breadth of monomer units (c) in the copolymer rubber before hydrogenation is substantially the same as that of the sum of monomer units (c) plus monomer units (d) in the copolymer rubber after hydrogenation.

Other polymerization conditions, for example, a polymerization medium, concentration of polymerization reaction liquid, kind and amount of a polymerization initiator, a polymerization temperature and a polymerization conversion at termination of polymerization, and hydrogenation conditions such as kind and amount of a hydrogenation catalyst and a hydrogenation temperature can be appropriately chosen according to the conventional procedures for producing a nitrile group-containing copolymer rubber and hydrogenating the nitrile group-containing copolymer rubber to produce a nitrile group-containing highly saturated copolymer rubber.

(Crosslikable Rubber Composition)

The crosslinkable rubber composition of the present invention comprises as essential ingredients the above-mentioned nitrile group-containing highly saturated copolymer rubber and a crosslinking agent, and other ingredients as optional Ingredients.

The crosslinking agent used is not particularly limited provided that it is capable of crosslinking the nitrile group-containing highly saturated copolymer rubber of the present invention. However, a sulfur-containing crosslinking agent and an organic peroxide crosslinking agent are preferably used.

As specific examples of the sulfur-containing crosslinking agent, there can be mentioned sulfur such as powdery sulfur and precipitated sulfur; and organic sulfur compounds such as 4,4'-dithiomorpholine, tetramethylthiuram disulfide, tetraethylthiuram disulfide and high molecular weight polysulfide. The amount of the sulfur-containing crosslinking agent is in the range of 0.1 to 5 parts by weight, preferably 0.2 to 4.5 parts by weight and more preferably 0.3 to 4 parts by weight, based on 100 parts by weight of the nitrile group-containing highly saturated copolymer rubber. When the amount of the sulfur-containing crosslinking agent is too small, the crosslinking density of rubber is reduced and the compression set becomes large. In contrast, when the amount of the sulfur-containing crosslinking agent Is too large, the resulting crosslinked rubber is liable to have poor flexural fatigue resistance and high dynamic heat build-up.

When a sulfur-containing crosslinking agent is used, a crosslinking accelerator such as zinc oxide, guanidine crosslinking accelerators, thiazole crosslinking accelerators, thiuram crosslinking accelerators or dithiocarbamate crosslinking accelerators is preferably used.

The organic peroxide crosslinking agent includes those which are used in rubber industry, such as dialkyl peroxides, diacyl peroxides and peroxyesters. Of these, dialkyl peroxides are preferable. As specific examples of the organic peroxide crosslinking agent, there can be mentioned dialkyl peroxides such as dicumyl peroxide, di-tert-butyl peroxide, 2,5-dimethyl-2,5-di(tert-butyl-peroxy)-3-hexyne, 2,5- dimethyl-2,5-di(tert-butyl-peroxy)hexane and 1,3-bis(tert-butyl-peroxyisopropyl)benzene; diacyl peroxides such as benzoyl peroxide and isobutyryl peroxide; and peroxy esters such as 2,5-dimethyl-2,5-bis(benzoyl-peroxy)hexane and tert-butyl-peroxyisopropyl carbonate, The amount of the organic peroxide crosslinking agent is in the range of 1 to 16 parts by weight, preferably 1 to 14 parts by weight and more preferably 1 to 12 parts by weight, based on 100 parts by weight of the nitrile group-containing highly saturated copolymer rubber. When the amount of the organic peroxide crosslinking agent is too small, the crosslinking density of rubber is reduced and the compression set becomes large. In contrast, when the amount of the organic peroxide crosslinking agent is too large, the resulting crosslinked rubber is liable to have poor rubber elasticity.

When an organic peroxide crosslinking agent is used, a crosslinking accelerator such as triallyl isocyanurate, trimethylolpropane trimethacrylate or N,N'-m-phenylenedimaleimide is preferably used.

The crosslinking accelerators may be used either alone or as a combination of at least two thereof. The crosslinking accelerator can be used as a dispersion in clay, calcium carbonate or silica whereby processability is enhanced. The amount of crosslinking accelerator is not particularly limited, and may be appropriately chosen depending upon the use of and properties required for crosslinked rubber product, the kind of crosslinking agent and the kind of crosslinking accelerator.

According to the need, various ingredients can be incorporated, in addition to the nitrile group-containing highly saturated copolymer rubber, the crosslinking agent and optional crosslinking accelerator and accelerator activator, in the rubber composition of the present invention. The ingredients include those which are conventionally used in rubber industry, for example, a reinforcing tiller such as carbon black or silica, a non-reinforcing filler such as calcium carbonate or clay, a processing aid, a plasticizer, an antioxidant, an anti-ozonant and a colorant. The amount of these ingredients is not particularly limited provided that the object and effect of the present invention can be achieved, and suitable amounts can appropriately chosen depending upon the particular use of ingredients.

Various rubbers, other than the nitrile group-containing highly saturated copolymer rubber, can be incorporated. The rubbers used are not particularly limited, But, when a nitrile group-containing copolymer rubber having a high degree of unsaturation such as the conventional acrylonitrile-butadiene copolymer rubber is incorporated. its amount should be not larger than 30 parts by weight, preferably not larger than 20 parts by weight and more preferably not larger than 10 parts by weight, based on 100 parts by weight of the nitrile group-containing highly saturated copolymer rubber. When the amount of a nitrile group-containing copolymer rubber having a high degree of unsaturation is too large, a crosslinked rubber product having good hot-air aging resistance, flexural fatigue resistance and elongation and reduced compression set cannot be obtained. When rubbers other than the nitrile group-containing highly saturated copolymer rubber are additionally used, a crosslinking agent capable of crosslinking these rubbers can be additionally used.

The procedure for preparing the crosslinkable rubber composition of the present invention is not particularly limited, and the rubber composition can be prepared by conventional procedures employed for general rubber compositions. An appropriate mixing method using a closed type mixer or a roll mixer can be employed, When a crosslinking agent is incorporated in the rubber composition, the kneading after incorporation of the crosslinking agent should be carried out at a temperature lower than the crosslinking-initiating temperature so as to avoid premature crosslinking. Usually, ingredients which are not easily thermally decomposed are first incorporated with the rubber, and then, crosslinking agent and crosslinking accelerator are added at a temperature lower than the crosslinking-initiating temperature.

(Crosslinked Rubber Product)

The crosslinked rubber product of the present invention is made by crosslinking the above-mentioned crosslinkable rubber composition. The method for making the crosslinked rubber product is not particularly limited. Usually the crosslinkable rubber composition is heated to effect crosslinking.

The heating temperature at crosslinking is preferably in the range of 100 to 200° C., more preferably 130 to 200° C. and especially preferably 140 to 200° C. When the heating temperature is too low, a substantially long time is required for crosslinking and the crosslinking density is liable to be reduced. In contrast, when the heating temperature is too high, the crosslinking time is too short and a defective molding is liable to be produced.

The crosslinking time can be appropriately chosen depending on the crosslinking method, crosslinking temperature and shape of the rubber product, and usually in the range of one minute to 20 hours in view of the crosslinking density and the production efficiency.

The heating means may be appropriately chosen from those which are employed for crosslinking rubbers and which includes, for example, press-heating, steam-heating, oven-heating and hot air-heating.

Now the invention will be specifically described by the following examples and comparative examples wherein parts and % are by weight unless otherwise specified. The properties of rubber were evaluated by the following methods.

(1) Dry Physical Properties

A crosslinkable rubber composition was press-cured at a temperature of 160° C. under a pressure of 10 MPa for 20 minutes, and then subjected to second curing at temperature of 150° C. for 2 hours by using a Geer oven to prepare a sheet with a thickness of 2 mm. The sheet was die-cut by a #3 dumbbell die to prepare a specimen. Breaking tensile strength, tensile modulus at 100% elongation and breaking elongation were measured according to Japanese Industrial Standard (JIS) K6251. Hardness was measured by using a durometer hardness tester, type A, according to JIS K6253.

(2) Hot-air Aging Properties

Hot-air aging test was carried out by a normal oven-testing method according to JIS K6257. A specimen was maintained at 135° C. for 168 hours, and then the dry physical properties were measured by the method mentioned above in (1). The change in % or points of the dry physical properties after the hot-air aging was determined.

(3) Oil Immersion

A specimen was immersed in testing lubricating oil #3 at 135° C. for 168 hours, and then the dry physical properties were measured by the method mentioned above in (1) and the volume was measured. The change in % of the volume and dry physical properties after the hot-air aging was determined.

(4) Cold Resistance

Gehman torsion test was conducted according to JIS K6261. Temperature ($T_{10}$) at which the torsion angle became 10 times of the torsion angle at normal temperature (23° C.) was measured. Further, $TR_{10}$ was measured by TR test according to JIS K6261.

(3) Permanent Set

A crosslinkable rubber composition was cured at a temperature of 160° C. under a pressure of 10 MPa for 20 minutes by using a mold having an inner diameter of 30 mm and a ring diameter of 3 mm, and then subjected to second curing at temperature of 150° C. for 2 hours to prepare a specimen. Permanent set was measured after the specimen was maintained in a 25% compressed state at a temperature of 150° C. for 72 hours according to JIS K6262.

(6) Dynamic Properties and Other Properties

A columnar specimen having a diameter of 17.8±0.1 mm and a height of 25±0.15 mm was cured at a temperature of 160° C. for 20 minutes, and then subjected to second curing at temperature of 150° C. for 2 hours, Then flexometer test was carried out according to ASTM D623-78 to evaluate the dynamic properties. The flexometer test was carried out by using a Goodrich flexometer wherein a dynamic displacement of 4.45 mm was imposed at a temperature of 100° C. and an initial load of 25 pounds (11.34 kg) for 25 minutes. Initial static strain (ISC), initial dynamic strain (IDC), final dynamic strain (FDC), heat build-up (HBU; HBU was expressed by the difference between the temperature of specimen as measured and the environmental temperature [100° C.]), and permanent set (PS) were determined.

(7) Number Average Molecular Weight, Molecular Weight Distribution

Number average molecular weight (Wn) and weight average molecular weight (Mw) were measured according to gel permeation chromatography using tetrahydrofuran as solvent and expressed in terms of standard polystyrene. A molecular weight distribution Mw/Mn was calculated from Mn and Mw.

(8) Class Transition Temperature

Extrapolated glass transition-initiating temperature (Tig) and extrapolated glass transition-ending temperature (Teg) were measured by using a heat flux differential scanning calorimeter according to JIS K7121 wherein the rate of temperature elevation was changed from 20° C./min to 10° C./min to enhance the precision of measurement.

EXAMPLE 1

A reactor was charged with 2 parts of potassium oleate as an emulsifier, 0.1 part of potassium phosphate as a stabilizer and 150 parts of water, and then, 20 parts of acrylonitrile, 15 parts of butyl acrylate, 35 parts of 1,3-butadiene and 0.45 part of tert-dodecyl mercaptan as a molecular weight modifier were added. Further 0.015 part of ferrous sulfate as an activator and 0.05 part of p-menthane hydroperoxide as a polymerization initiator were added to initiate an emulsion polymerization at 10° C. When the polymerization conversion reached 60%, 10 parts of acrylonitrile, 10 parts of butyl acrylate and 10 parts of 1,3-butadiene were added. When the polymerization conversion reached 85%, 0.2 part of hydroxylamine per 100 parts of the total monomers was added to stop the polymerization. During polymerization, an extremely minor amount of polymerization liquid was withdrawn at every 3% increase of polymerization conversion to determine the contents of monomers in a minute section of polymer. After termination of polymerization, the polymerization mixture was heated and steam distillation was conducted at 10° C. under a reduced pressure to collect unreacted monomers. 2 parts of an alkylated phenol as an antioxidant was added to prepare a copolymer latex.

Then the copolymer latex was poured into 3,000 parts of an aqueous coagulating solution maintained at 50° C. and having 3 parts of calcium chloride as a coagulating agent dissolved therein to coagulate the latex. The thus-obtained crumb was washed with water and dried at 50° C. under a reduced pressure.

The thus-obtained nitrile group-containing copolymer rubber was dissolved in methyl isobutyl ketone, and hydrogenation was carried out by using a palladium/silica catalyst in a pressure vessel to prepare a nitrile group-containing highly saturated copolymer rubber.

The contents of monomer units in the whole polymer, the maximum content and minimum content of each of monomer units in minute sections of polymer, composition distribution breadth and physical properties of crosslinked rubber products are shown in Table 1 and Table 3.

The contents of monomer units in the nitrile group-containing highly saturated copolymer rubber were measured by $^1$H-NMR, iodine value determination and nitrogen content determination by semi-micro Kjeldahl method. It was confirmed that there was no contradiction between the amount of monomers consumed for polymerization and the amount of residual monomers.

To 100 parts of the nitrile group-containing highly saturated copolymer rubber, 5 parts of zinc oxide No. 1, 1 part of stearic acid, 0.5 part of sulfur, 55 parts of FEF carbon black (Asahi #60 available from Asahi Carbon K.K.), 2 parts of tetramethylthiuram disulfide and 0.5 part of 2-mercaptobenzothiazol were added and the mixture was kneaded together to preapre a crosslinkable rubber composition. The crosslinkable rubber composition was crosslinked to prepare a crosslinked rubber specimen. Physical properties of the specimen were evaluated.

EXAMPLES 2–5

Comparative Examples 1–9

Polymerization was carried by the same procedures as employed in Example I except that the amounts of monomers charged and the amounts of monomers added in the middle of polymerization were varied as shown in Table 1 or Table 2. Crosslinked rubber products were made by the same procedures as employed in Example 1, and physical properties were evaluated. The results are shown in Tables 1, 2, 3 and 4.

In Table 4, "-" means that measurement was not carried out. In Comparative Examples 1–9, the entire amount of monomers were initially charged, and monomer addition was not carried out in the middle of polymerization.

TABLE 1

|  |  | Examples | | | | | Com. Ex. | |
|---|---|---|---|---|---|---|---|---|
|  |  | 1 | 2 | 3 | 4 | 5 | 1 | 2 |
| Amount of monomer (wt. parts) | | | | | | | | |
| AN, | initially charged | 19 | 19 | 9 | 9 | 9 | 29 | 29 |
|  | added at middle | 10 | 10 | 10 | 10 | 10 | 0 | 0 |
| BA, | initially charged | 18 | 28 | 28 | 13 | 43 | 28 | 38 |
|  | added at middle | 10 | 10 | 10 | 10 | 10 | 0 | 0 |
| Bu, | initially charged | 33 | 23 | 33 | 48 | 18 | 43 | 33 |
|  | added at middle | 10 | 10 | 10 | 10 | 10 | 0 | 0 |
| Amount of monomer units in copolymer rubber (wt. %) | | | | | | | | |
| Acrylonitrile monomer units (a) | | | | | | | | |
| Total content | | 30 | 30 | 20 | 20 | 20 | 30 | 30 |
| Max content in minute sec. | | 30.7 | 30.9 | 21.7 | 20.4 | 20.7 | 36.5 | 33.8 |
| Min content in minute sec. | | 28.3 | 28.2 | 20.3 | 18.6 | 19.3 | 27.5 | 24.2 |
| Compn distribution breadth | | 8 | 9 | 7 | 9 | 7 | 30 | 32 |
| Butyl acrylate monomer units (b) | | | | | | | | |
| Total content | | 25 | 35 | 35 | 20 | 50 | 25 | 35 |
| Max content in minute sec. | | 25.5 | 37.6 | 36.1 | 21.9 | 51.8 | 27.3 | 43.0 |
| Min content in minute sec. | | 23.5 | 34.4 | 32.9 | 20.1 | 48.3 | 20.8 | 31.1 |
| Compn distribution breadth | | 8 | 9 | 9 | 9 | 7 | 26 | 34 |
| 1,3-Butadiene monomer units (c) | | | | | | | | |
| Total content | | 5 | 5 | 5 | 5 | 5 | 5 | 5 |
| Saturated butadiene units (d) | | | | | | | | |
| Total content | | 40 | 30 | 40 | 55 | 25 | 40 | 30 |
| Units(c) + units(d) | | | | | | | | |
| Total content | | 45 | 35 | 45 | 60 | 30 | 45 | 35 |
| Max content in minute sec. | | 47.6 | 35.6 | 46.1 | 61.3 | 31.0 | 49.4 | 38.0 |
| Min content in minute sec. | | 44.4 | 33.5 | 42.9 | 57.7 | 28.9 | 38.6 | 30.0 |
| Compn distribution breadth | | 7 | 6 | 7 | 6 | 7 | 24 | 23 |
| Units(d)/[units(c) + units(d)] | | 88.9 | 85.7 | 88.9 | 91.7 | 83.3 | 88.9 | 85.7 |
| Tig (° C.) | | −39.1 | −39.2 | −41.3 | −40.9 | −38.2 | −39.4 | −39.7 |
| Teg (° C.) | | −31.3 | −31.1 | −33.3 | −33.1 | −30.1 | −26.7 | −26.7 |
| ΔT (° C.) | | 7.8 | 8.1 | 8.0 | 7.8 | 8.1 | 12.7 | 13.0 |
| Mn × $10^{-3}$ | | 90 | 88 | 92 | 90 | 91 | 91 | 93 |
| Mw/Mn | | 5.9 | 6.2 | 6.1 | 6.3 | 6.1 | 9.9 | 10.5 |

Note, AN: Acrylonitrile
BA: Butyl acrylate
Bu: 1,3-Butadiene

TABLE 2

|  |  | Comparative Examples | | | | | | |
|---|---|---|---|---|---|---|---|---|
|  |  | 3 | 4 | 5 | 6 | 7 | 8 | 9 |
| Amount of monomer (wt. parts) | | | | | | | | |
| AN, | initially charged | 19 | 19 | 19 | 4 | 44 | 19 | 35 |
|  | added at middle | 0 | 0 | 0 | 0 | 0 | 0 | 0 |
| BA, | initially charged | 38 | 23 | 53 | 38 | 38 | 8 | 0 |
|  | added at middle | 0 | 0 | 0 | 0 | 0 | 0 | 0 |
| BU, | initially charged | 43 | 58 | 28 | 58 | 18 | 73 | 65 |
|  | added at middle | 0 | 0 | 0 | 0 | 0 | 0 | 0 |
| Amount of monomer units in copolymer rubber (wt. %) | | | | | | | | |
| Acrylonitrile monomer units (a) | | | | | | | | |
| Total content | | 20 | 20 | 20 | 5 | 45 | 20 | 35 |
| Max content in minute sec. | | 24.8 | 20.7 | 21.7 | 5.1 | 54.9 | 22.7 | 40.8 |
| Min content in minute sec. | | 19.2 | 15.3 | 16.3 | 4.6 | 39.1 | 17.3 | 29.4 |
| Compn distribution breadth | | 28 | 27 | 27 | 22 | 35 | 27 | 32 |
| Butyl acrylate monomer units (b) | | | | | | | | |
| Total content | | 35 | 20 | 50 | 35 | 35 | 5 | 0 |
| Max content in minute sec. | | 39.4 | 24.3 | 55.0 | 42.8 | 39.6 | 5.6 | — |
| Min content in minute sec. | | 28.6 | 19.7 | 43.0 | 31.2 | 28.4 | 4.5 | — |
| Compn distribution breadth | | 31 | 23 | 24 | 33 | 32 | 22 | — |

TABLE 2-continued

|  | Comparative Examples | | | | | | |
| --- | --- | --- | --- | --- | --- | --- | --- |
|  | 3 | 4 | 5 | 6 | 7 | 8 | 9 |
| 1,3-Butadiene monomer units (c) | | | | | | | |
| Total content | 5 | 5 | 5 | 5 | 5 | 5 | 5 |
| Saturated butadiene units (d) | | | | | | | |
| Total content | 40 | 55 | 25 | 55 | 15 | 70 | 60 |
| Units(c) + units(d) | | | | | | | |
| Total content | 45 | 60 | 30 | 60 | 20 | 75 | 65 |
| Max content in minute sec. | 49.2 | 63.8 | 35.9 | 64.0 | 21.5 | 78.1 | 70.6 |
| Min content in minute sec. | 38.8 | 48.2 | 28.1 | 48.2 | 16.5 | 57.9 | 59.4 |
| Compn distribution breadth | 23 | 26 | 26 | 23 | 25 | 27 | 17 |
| Units(d)/[units(c) + units(d)] | 88.9 | 91.7 | 83.3 | 91.7 | 75 | 93.3 | 92.3 |
| Tig (° C.) | −41.9 | −42.3 | −38.4 | −45.8 | −35.5 | −43.6 | −31.9 |
| Teg (° C.) | −29.0 | −29.8 | −25.6 | −32.7 | −22.7 | −30.4 | −19.2 |
| ΔT (° C.) | 12.9 | 12.5 | 12.8 | 13.1 | 12.8 | 13.2 | 12.7 |
| Mn × $10^{-3}$ | 89 | 90 | 93 | 90 | 94 | 92 | 90 |
| Mw/Mn | 10.3 | 9.8 | 10.5 | 10.5 | 10.0 | 10.7 | 9.8 |

Note, AN: Acrylonitrile
BA: Butyl acrylate
Bu: 1,3-Butadiene

TABLE 3

|  | Examples | | | | | Com. Ex. | |
| --- | --- | --- | --- | --- | --- | --- | --- |
|  | 1 | 2 | 3 | 4 | 5 | 1 | 2 |
| Dry properties | | | | | | | |
| Tensile strength (MPa) | 21.9 | 18.8 | 20.3 | 21.3 | 17.9 | 21.0 | 17.7 |
| Elongation (%) | 420 | 410 | 450 | 440 | 480 | 400 | 400 |
| 100% tensile modulus (MPa) | 5.2 | 5.5 | 4.0 | 4.2 | 4.2 | 5.1 | 5.3 |
| Hardness | 69 | 69 | 68 | 68 | 67 | 69 | 68 |
| Change after heating at 135° C. or 168 hours | | | | | | | |
| Tensile strength change(%) | 2 | 3 | 2 | 3 | 3 | 5 | 5 |
| Elongation change (%) | −34 | −33 | −35 | −37 | −41 | −37 | −35 |
| 100% tensile stress change (%) | 105 | 110 | 108 | 107 | 111 | 101 | 103 |
| Hardness change | 10 | 10 | 11 | 10 | 11 | 9 | 9 |
| Change after heating in oil at 135° C. for 168 hours | | | | | | | |
| Volume change (%) | 15 | 13 | 34 | 39 | 28 | 19 | 15 |
| Tensile strength change(%) | −17 | −14 | −38 | −41 | −35 | −17 | −13 |
| Elongation change (%) | 25 | 28 | 5 | 7 | 6 | 22 | 24 |
| 100% tensile stress change (%) | −49 | −47 | −62 | −70 | −66 | −52 | −49 |
| Hardness change | −16 | −13 | −28 | −29 | −26 | −17 | −13 |
| Cold resistance | | | | | | | |
| $T_{10}$ (° C.) | −37 | −37 | −39 | −39 | −36 | −35 | −35 |
| $TR_{10}$ (° C.) | −37 | −37 | −39 | −40 | −36 | −35 | −35 |
| Permanent set (%) | 64 | 63 | 64 | 66 | 63 | 66 | 66 |
| Dynamic properties and others | | | | | | | |
| Initial static strain(%) | 19.3 | 19.7 | 19.7 | 20.5 | 21.0 | 20.8 | 21.1 |
| Initial dynamic strain(%) | 10.4 | 10.8 | 10.6 | 11.4 | 11.6 | 12.0 | 12.3 |
| Final dynamic strain(%) | 10.1 | 10.0 | 10.9 | 11.3 | 11.6 | 11.7 | 11.9 |
| Heat build-up (° C.) | 17 | 18 | 17 | 20 | 20 | 22 | 22 |
| Permanent set (%) | 2.96 | 3.12 | 3.05 | 3.36 | 3.24 | 3.78 | 3.93 |
| Change after heating in oil at 135° C. for 168 hours | | | | | | | |
| Initial static strain change (%) | 4.7 | 5.1 | 4.8 | 6.2 | 6.5 | 10.9 | 12.0 |
| Initial dynamic strain change (%) | 2.6 | 2.5 | 2.7 | 4.5 | 4.6 | 6.0 | 6.3 |
| Final dynamic strain change (%) | 2.3 | 2.4 | 2.7 | 4.3 | 4.4 | 5.7 | 6.1 |
| Heat build-up change (%) | 3 | 4 | 3 | 6 | 7 | 9 | 9 |
| Permanent set change (%) | 1.01 | 1.06 | 1.03 | 1.53 | 1.58 | 1.90 | 1.96 |

TABLE 4

|  | Comparative Examples | | | | | | |
| --- | --- | --- | --- | --- | --- | --- | --- |
|  | 3 | 4 | 5 | 6 | 7 | 8 | 9 |
| Dry properties | | | | | | | |
| Tensile strength (MPa) | 19.0 | 20.9 | 17.2 | 19.5 | 16.1 | 22.3 | 24.4 |
| Elongation (%) | 440 | 430 | 480 | 450 | 470 | 410 | 440 |
| 100% tensile modulus (MPa) | 3.9 | 4.0 | 4.1 | 2.8 | 6.1 | 4.2 | 4.3 |
| Hardness | 67 | 68 | 66 | 68 | 69 | 69 | 72 |
| Change after heating at 135° C. or 168 hours | | | | | | | |
| Tensile strength change(%) | 5 | 6 | 6 | 4 | 3 | 7 | 2 |
| Elongation change (%) | −38 | −37 | −43 | −40 | −37 | −36 | −39 |
| 100% tensile stress change (%) | 103 | 101 | 106 | 108 | 102 | 98 | 129 |
| Hardness change | 9 | 9 | 10 | 10 | 9 | 9 | 8 |
| Change after heating in oil at 135° C. for 168 hours | | | | | | | |
| Volume change (%) | 38 | 43 | 32 | 62 | 4 | 53 | 9 |
| Tensile strength change(%) | −39 | −43 | −37 | −59 | −2 | −48 | −4 |
| Elongation change (%) | 2 | 3 | 2 | 5 | 23 | 3 | 39 |
| 100% tensile stress change (%) | −69 | −72 | −65 | −89 | −38 | −76 | −44 |
| Hardness change | −26 | −28 | −25 | −35 | −8 | −30 | −7 |
| Cold resistance | | | | | | | |
| $T_{10}$ (° C.) | −37 | −38 | −34 | −41 | −31 | −39 | −28 |
| $TR_{10}$ (° C.) | −38 | −39 | −35 | −41 | −31 | −39 | −28 |
| Permanent set (%) | 66 | 68 | 65 | 69 | 66 | 68 | 64 |
| Dynamic properties and others | | | | | | | |
| Initial static strain(%) | 21.4 | 21.1 | 22.2 | 22.4 | 20.7 | 20.8 | 15.4 |
| Initial dynamic strain(%) | 12.6 | 12.4 | 12.9 | 13.2 | 12.1 | 12.1 | 6.89 |
| Final dynamic strain(%) | 12.2 | 12.0 | 12.5 | 13.0 | 11.8 | 11.8 | 6.53 |
| Heat build-up (° C.) | 22 | 22 | 22 | 23 | 22 | 22 | 24 |
| Permanent set (%) | 3.83 | 3.93 | 3.72 | 4.13 | 3.91 | 4.10 | 2.60 |
| Change after heating in oil at 135° C. for 168 hours | | | | | | | |
| Initial static strain change (%) | 11.6 | 11.8 | 12.5 | — | — | — | — |
| Initial dynamic strain change (%) | 6.1 | 7.2 | 6.8 | — | — | — | — |
| Final dynamic strain change (%) | 5.8 | 6.7 | 6.6 | — | — | — | — |
| Heat build-up change (%) | 9 | 10 | 9 | — | — | — | — |
| Permanent set change (%) | 1.95 | 2.01 | 1.93 | — | — | — | — |

As seen from Comparative Examples 1–5, a nitrile group-containing highly saturated rubber having a large composition distribution breadth and a large difference exceeding 10° C. between the extrapolated glass transition-initiating temperature (Tig), and the extrapolated glass transition-ending temperature (Tag) gives a crosslinked rubber product exhibiting undesirably large dynamic properties and other properties when it is placed in contact with oil at a high temperature. Thus, the use of the crosslinked rubber product is limited.

As seen from Comparative Examples 6–9, a nitrile group-containing highly saturated copolymer rubber having a monomer unit composition, which does not satisfy the requirement of the present invention, gives a crosslinked rubber product having cold resistance and oil resistance, which are unsatisfactorily balanced.

In contrast, as seen from Examples 1–5, a nitrile group-containing highly saturated copolymer rubber of the present Invention gives a crosslinked rubber product exhibiting good and balanced cold resistance, oil resistance and dynamic properties.

INDUSTRIAL APPLICABILITY

The nitrile group-containing highly saturated copolymer rubber of the present invention gives a crosslinked rubber product exhibiting good and balanced heat resistance, cold resistance, oil resistance and dynamic properties. Therefore, the nitrile group-containing highly saturated copolymer rubber is used as rubber materials for vibration insulators, hoses, window frames, belts, diaphragms, shoe soles and automobile parts.

What is claimed is:

1. A nitrile group-containing highly saturated copolymer rubber comprising (a) 10 to 40% by weight of α,β-ethylenically unsaturated nitrile monomer units, (b) 10 to 60% by weight of α,β-ethylenically unsaturated carboxylic acid ester monomer units, (c) 0.01 to 21% by weight of conjugated diene monomer units, and (d) 14 to 69.99% by weight of saturated conjugated diene monomer units, wherein the sum of monomer units (a) and monomer units (d) is in the range of 20 to 70% by weight, the ratio of monomer units (d) to the sum of monomer units (c) and monomer units (d) is at least 70% by weight, and the difference between the extrapolated glass transition-initiating temperature (Tig) and the extrapolated glass transition-ending temperature (Teg), as measured by the differential scanning calorimetry, is not higher than 10° C.

2. The nitrile group-containing highly saturated copolymer rubber according to claim 1, which comprises 15 to 30% by weight of monomer units (a), 20 to 50% by weight of monomer units (b), 0.1 to 12% by weight of monomer units (c), and 28 to 59.9% by weight of monomer units (d), wherein the sum of monomer units (c) and monomer units (d) is in the range of 35 to 60% by weight, the ratio of monomer unite (d) to the sum of monomer units (c) and monomer units (d) is at least 80% by weight.

3. The highly saturated nitrile group-containing copolymer rubber according to claim 1, wherein the difference between the extrapolated glass transition-initiating temperature (Tig) and the extrapolated glass transition-ending temperature (Teg) as measured by the differential scanning calorimetry is not higher than 8.5° C.

4. The highly saturated nitrile group-containing copolymer rubber according to claim 1, which is made by a process wherein an α,β-ethylenically unsaturated nitrile monomer, an α,β-ethylenically unsaturated carboxylic acid ester monomer and a conjugated diene monomer are copolymerized, and then, selectively hydrogenating conjugated diene monomer units of the obtained copolymer rubber.

5. The nitrile group-containing highly saturated copolymer rubber according to claim 4, wherein the copolymerization of an α,β-ethylenically unsaturated nitrile monomer, an α,β-ethylenically unsaturated carboxylic acid ester monomer and a conjugated diene monomer is carried out while the concentrations of these monomers in a polymerization system are controlled by adding these monomers in the course of polymerization, and the obtained copolymer rubber is hydrogenated to an extent such that the ratio of monomer units (d) to the sum of monomer units (c) and monomer units (d) is at least 70% by weight, whereby a nitrile group-containing highly saturated copolymer rubber is obtained wherein the monomer units (a), monomer units (b) and the sum of monomer units (c) and monomer units (d) have a composition distribution breadth of not larger than 20%.

6. The highly saturated nitrile group-containing copolymer rubber according to claim 1, wherein the α,β-ethylenically unsaturated nitrile monomer is acrylonitrile.

7. The highly saturated nitrile group-containing copolymer rubber according to claim 1, wherein the α,β-ethylenically unsaturated carboxylic acid ester monomer is butyl acrylate.

8. The highly saturated nitrile group-containing copolymer rubber according to claim 1, wherein the conjugated diene monomer is 1,3-butadiene.

9. A crosslinkable rubber composition comprising 100 parts by weight of the highly saturated nitrile group-containing copolymer rubber as claimed in claim 1, and 0.1 to 5 parts by weight of a sulfur-containing vulcanizing agent or 1 to 16 parts by weight of an organic peroxide crosslinking agent.

10. A crosslinked rubber product made by crosslinking the crosslinkable rubber composition as claimed in claim 9.

* * * * *